US000001342H

United States Statutory Invention Registration [19]

[11] Reg. Number: H1342

Whitesell

[43] Published: Aug. 2, 1994

[54] EFFECTUATING FULL DUPLEX DIGITAL DATA TRANSFER

[75] Inventor: Eric J. Whitesell, San Diego, Calif.

[73] Assignee: The United States of America as represented by the Secretary of the Navy, Washington, D.C.

[21] Appl. No.: 624,377

[22] Filed: Dec. 7, 1990

[51] Int. Cl.[5] ..... G06F 13/00

[52] U.S. Cl. ..... 395/275; 395/325

[58] Field of Search ..... 395/325, 275

[56] References Cited

U.S. PATENT DOCUMENTS

| | | | |
|---|---|---|---|
| 3,710,324 | 1/1973 | Cohen | 395/275 |
| 4,225,942 | 9/1980 | Kobs | 395/275 |
| 4,481,572 | 11/1984 | Ochsner | 395/325 |
| 4,626,985 | 12/1986 | Briggs | 395/800 |
| 5,003,508 | 3/1991 | Hall | 395/325 |

*Primary Examiner*—Bernarr E. Gregory
*Attorney, Agent, or Firm*—Harvey Fendelman; Thomas Glenn Keough; Michael A. Kagan

[57] ABSTRACT

A method for the simultaneous bidirectional transfer of digital data at a very high rate between a host digital data processor and an external device includes the steps of: loading the output data into a data register of the processor; loading an address reference of an external device into an address register of the processor; forming a composite address consisting of the sum of the data register and an address register; and exporting the output data through the address lines from the processor to the external device while simultaneously reading data into the processor from the external device. The method accomplishes rapid data transfer by advantageously transferring data over what would normally be address lines between the processor and the external device. This method is suitable for applications where data is to be transferred from a processor operably coupled to only one external device.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EFFECTUATING FULL DUPLEX DIGITAL DATA TRANSFER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the field of data transfer, and more particularly, to a method for providing continuous bidirectional transfer of data with external data acknowledge. External data acknowledge is a control line from the receiving device to the sending device used to prevent data from being presented faster than the receiving device can accept it.

Digital computers and peripherals built to VME standards offer a wide selection of modules that can be assembled into systems which are capable of performing many design functions. An example of a medium priced, VME single board computer is the FORCE Computers Model CPU-33XB which offers three ways to export parallel data. The first way is an industry standard data transfer circuit called the 68230 Parallel Input-output/Timer (PI/T). The PI/T offers two eight bit ports that can be combined to output 16 lines of data with external acknowledge. Because of internal limitations, however, the continuous rate of data transfer of this device is less than 200,000 bytes per second. The second way is referred to as "Direct Memory Access" (DMA). This method offers a high data transfer rate with external acknowledge, but is limited to transferring only one block of data at a time. The DMA registers must be reloaded after each block, creating timing gaps that severely reduce the continuous data transfer rate. The third method uses a local I/O port which allows access to the address bus and the data bus of the CPU. This method offers a high continuous data transfer rate (eight bits per transfer), but there is no provision for external data acknowledge to prevent data overrun.

None of these methods offers data transfer rates in the range of 4 megabits per second with external data acknowledge, severely limiting the capability of exporting data from a VME system to an external device. Therefore, there is a need for a method that is capable of utilizing the local I/O port of a processor in a manner which provides a continuous data transfer rate of at least 4,000,000 bytes per second and incorporates an external data acknowledge function.

SUMMARY OF THE INVENTION

A method is disclosed for exporting output data at a very high rate from a host digital data processor through address lines to an external device. This method includes the steps of: loading the output data into a data register of the processor; loading an address reference of an external device into an address register of the processor; forming a composite address consisting of the sum of the address register and data register; and exporting the output data through the address lines from the processor to the external device while simultaneously reading status data into the processor from the external device through the processor data lines. The invention accomplishes such rapid data transfer by advantageously transferring data over what would normally be address lines between the processor and the external device. This method is suitable for applications where data is to be transferred from a processor operably coupled to only one external device.

DESCRIPTION OF THE PREFERRED EMBODIMENT

Figure 1:
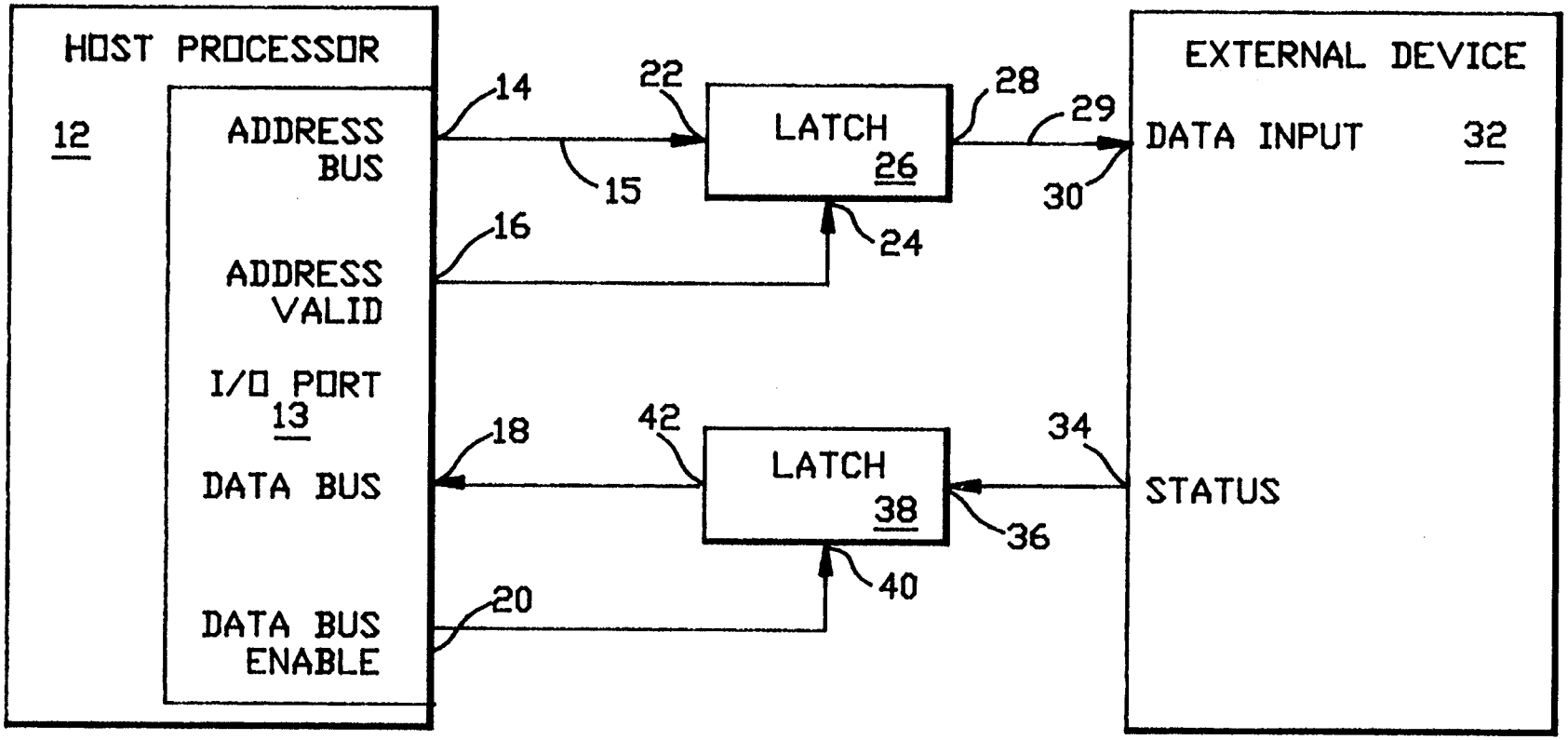
FIG. 1 is a block diagram of one means of implementing the method of the present invention for continuously transferring data in synchronization with an external data acknowledge signal.

The present invention provides a method for transferring data at continuous high rates synchronized to an external data acknowledge signal, where for example, continuous data transfer rates of 4,000,000 bytes per second have been achieved. Referring to FIG. 1, there is illustrated system 10 for implementing the method of the present invention generally consisting of host digital data processor 12, a latch 26 to hold output data, a latch 38 to hold input data, and an external device 32, all configured as described below.

Host digital data processor 12 has local I/O port 13 which includes address output bus 14, address valid output 16, data bus input 18, and data bus enable output 20. Implementation of the present invention requires that local I/O port 13 have 16 address lines and 8 data lines. One example of a processor suitable for implementing the present invention is a FORCE model CPU-33, although the scope of the present invention includes the use of other suitable processors having the essential features described above. Address output bus 14 is operably coupled to input 22 of latch 26 by 16-bit bus 15. Address valid output 16 is operably coupled to input 24 of latch 26, which presents the instantaneous contents of address output bus 14 to latch output 28. Latch 26 may, for example, be a 16-bit latch. Output 28 is operably coupled to data input 30 of external device 32 by 16-bit bus 29. External device 32 also includes status output 34 operably coupled to status input 26 of latch 38, which may be an 8-bit latch. External device 32 preferably has at least 16 data lines and be able to output some form of status or other data, for example, of 8-bits, as is typical with peripheral devices. When local I/O port 13 provides data bus enable output 20 to latch 38, then the instantaneous contents of status output 34 is presented to data bus 18 through latch 38. The status output signal includes the data acknowledge signal from external device 32.

The present invention solves the problem of enhancing the data output rate of a digital processor by outputting the data 16 bits at a time over the 16 address lines of processor 12 instead of eight bits at a time over the eight data lines. This doubles the effective data transfer rate of processor 12. The 16 address lines are normally used to select one of many possible I/O devices, but if the entire I/O port is dedicated to only one device, which is done in the implementation of the present invention, then I/O port 13 may be used exclusively for data transfer. The data bus 18 is available to be used as a device status indicator which includes a data acknowledge signal that indicates to processor 12 that the current data has been accepted by external device 32.

Data transfer is effected by a programmed sequence of instructions executed by processor 12, described further herein, which may be implemented as the following Motorola 68000 assembly language instructions:

```
L1: MOVE.B (A1,D1.L),D0
    BEQ L1
```

Figure 2:
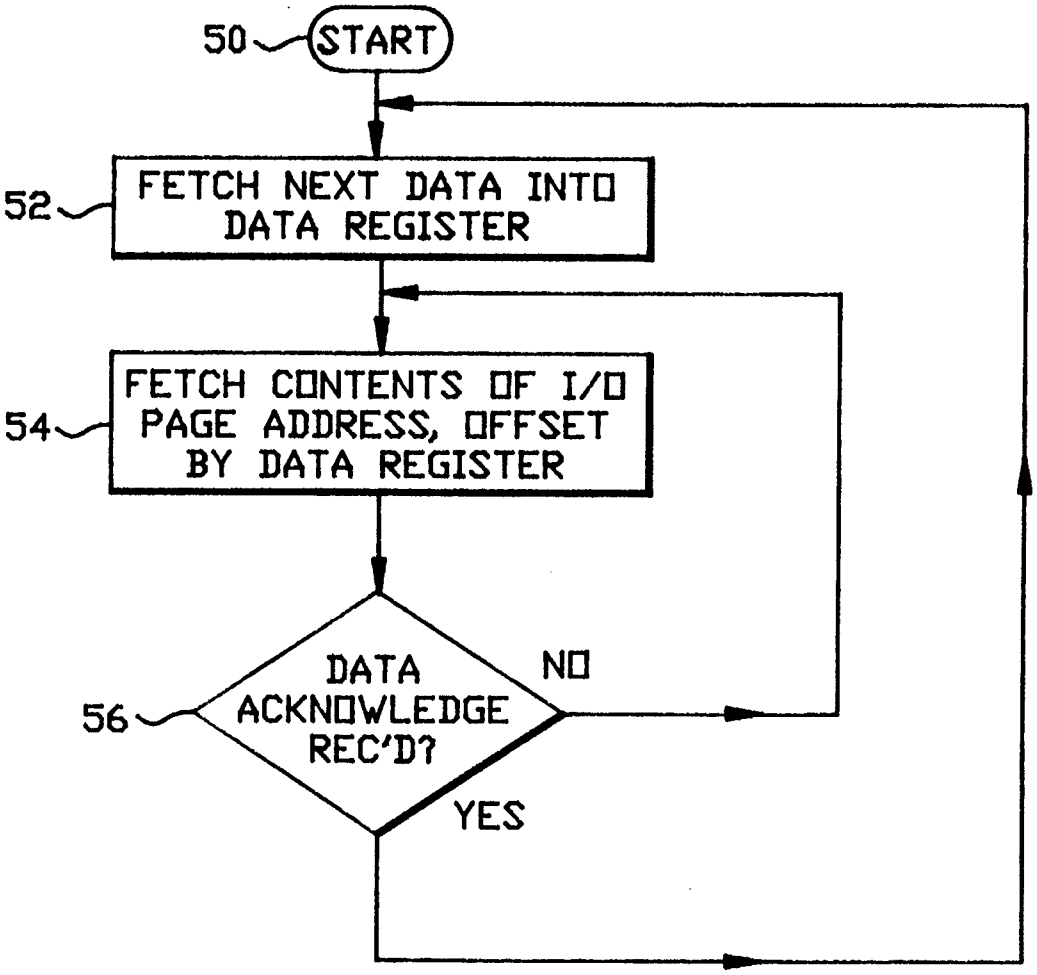
FIG. 2 is a flow chart of a series of instructions which are executed by the processor.

A flowchart of these instructions is presented in FIG. 2, and is described as follows: Starting at step 50 the data to be output is loaded into data register D1, as shown in step 52. This data register is used as an offset to address register A1 containing the address of I/O port 13. The first instruction is a move that reads a byte of data from the offset address into data register D0 at sept 54. This instruction causes the I/O port 13 to be selected, the offset to be passed on to the 16 address lines of I/O port 13, and the 8 data lines containing the data acknowledge and other device status or data to be read into data register D0, while external device 32 is presented with the data on the 16 address lines of I/O port 13 via latch 26. At step 56, the data acknowledge bit from external device 32 that was read into the sign bit of data register D0 is examined. If data acknowledge was not received, the program returns to the read instruction at step 54. If the data acknowledge was received, the program returns to the data transfer cycle at step 52. In this way, data is presented to external device 32 at a rate at which external device 32 is able to accept the data.

The method of the present invention includes using time multiplexed or separate address and data lines because the address valid signal distinguishes address from data in either case. Furthermore, this method may be used to transfer data synchronously (at a fixed frequency) or asynchronously (as fast as the external can accept data) in accordance with techniques well known by those skilled in this field of technology. Asynchronous data transfer would be accomplished by using the address valid signal in conjunction with the data acknowledge signal. Synchronous data transfer would be accomplished by using a fixed frequency clock in conjunction with the data acknowledge signal.

Obviously, many modifications of the present invention are possible in light of the above teachings. It is therefore to be understood that within the scope of the appended claims, the invention may be practiced otherwise than as specifically described.

I claim:

1. A method for transferring digital data between devices, comprising the steps of:

executing a first instruction in a digital processor, having address and data lines which fetches m-bit output data from a memory into a data register, where "m" is a positive integer;

executing a second instruction in said digital processor which fetches an address reference of an external device from said memory into an address register of said digital processor, said external device having n-bit external data on external data lines, where "n" is a positive integer; and executing a third instruction in said digital processor which places said output data and said address reference onto said address lines, and causes said output data from said address lines of said digital processor and said external data from said external data lines to be sampled by a plurality of data latches, and causes transference of said output data to said external device and transference of said external data to said digital processor from said plurality of data latches substantially simultaneously.

2. The method of claim 1 wherein said address lines and said output data lines of said digital processor are separate.

3. The method of claim 1 wherein said address and data lines of said digital processor are time multiplexed.

* * * * *